No. 628,732.  
G. D. WING.  
NUT LOCK.  
(Application filed Apr. 5, 1899.)  
(No Model.)  
Patented July 11, 1899.
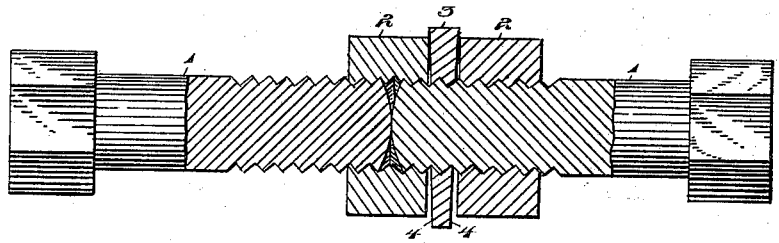
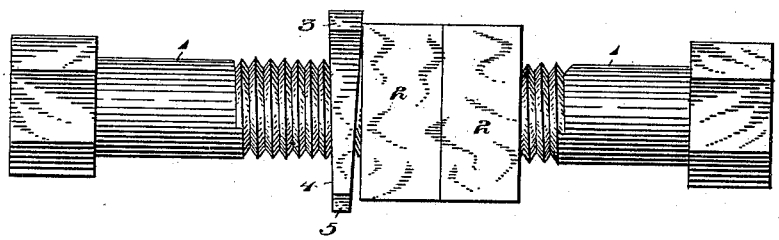
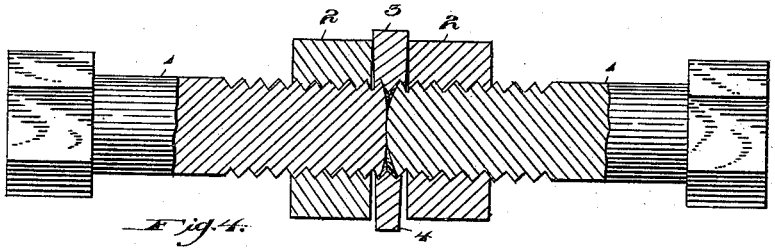
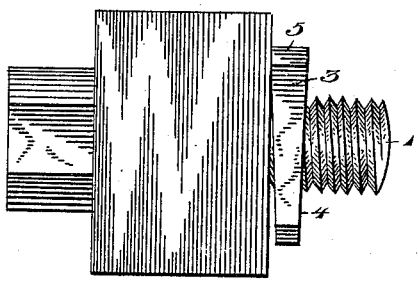  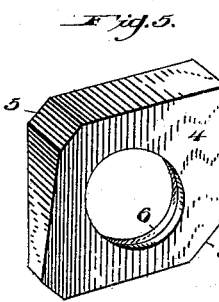
WITNESSES:  
J. P. Appleman  
E. E. Potter
INVENTOR  
G. D. Wing.  
BY  
N. C. Evert & Co.  
ATTORNEYS.
THE NORRIS PETERS CO., PHOTO-LITHO., WASHINGTON, D. C.

UNITED STATES PATENT OFFICE.

GEORGE D. WING, OF PITTSBURG, PENNSYLVANIA.

NUT-LOCK.

SPECIFICATION forming part of Letters Patent No. 628,732, dated July 11, 1899.

Application filed April 5, 1899. Serial No. 711,823. (No model.)

*To all whom it may concern:*

Be it known that I, GEORGE D. WING, a citizen of the United States of America, residing at Pittsburg, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and more particularly to that class of inventions that are locked by means of a washer.

The primary object of the invention is to securely lock a nut upon a bolt at any desired point, and, furthermore, to design a nut-lock of the above-referred-to class that is applicable to any bolt and nut now in use.

The invention further aims to construct a device of this character that will be extremely simple in its construction, strong, durable, and highly efficient in its operation, and, furthermore, a device that may be manufactured at a comparatively small cost.

The invention has for its still further object to construct a nut-lock that will serve a double purpose—namely, one that will lock a nut and also serve as a union or coupling and also securely lock two sections of bolts or shafting together.

A still further object of my invention is to construct a device of the character heretofore set forth that will in many cases dispense with the use of a nut entirely, and, furthermore, possessing advantages of being applied to the screw-threads with either face abutting against the nut, thereby rendering the washer reversible.

With the above and other objects in view my invention finally consists in the novel construction of a washer to be hereinafter more particularly described, and specifically pointed out in the claims.

In describing the invention in detail reference is had to the accompanying drawings, forming a part of this specification, and wherein like numerals of reference indicate like parts throughout the several views of the drawings, in which—

Figure 1 is a longitudinal vertical sectional view of a pair of bolts and nuts, showing my improved washer interposed between the nuts. Fig. 2 is a side elevation of the same, showing the washer arranged on a bolt in the rear of the nuts. Fig. 3 is a longitudinal vertical sectional view showing the washer arranged at the junction of the two sections and clearly illustrating the manner in which the washer may be employed to form a coupling or union. Fig. 4 is a side elevation of a bolt having arranged thereon my improved washer and illustrating the advantages obtained when the nut is dispensed with. Fig. 5 is a view in perspective of my improved washer.

In referring to the drawings the numeral 1 indicates screw-threaded bolts of the ordinary construction, upon which are arranged ordinary nuts 2 2.

The reference-numeral 3 indicates the washer, having its faces 4 4 converging toward the horizontal plane, the said washer in cross-section forming a perfect wedge. The reference-numerals 5 5 indicate the beveled sides of the washer, which give the same an approximately octagonal form, as illustrated in the drawings. (See Fig. 5.) The said washer 3 is interiorly screw-threaded, as shown by the reference-numeral 6.

When it is desired to lock a nut upon a bolt at any predetermined point, the nut is placed upon the latter and adjusted to the desired position. The washer is then placed upon the bolt until one of the converging faces is adjacent to and abuts against the face of the nut. At this point the washer is drawn more tightly against the nut, bringing the converging portion in closer proximity to the face of the nut. This latter operation will tend to mutilate the thread, and in some instances where an extreme pressure is brought to bear upon the washer it may cause the bolt to slightly spring. The nut is thus securely locked and cannot be removed without stripping a portion of the thread. It has been demonstrated in actual practice that it is almost impossible to remove the nut at all and that the device is equal to the most severe tests to which it can be subjected. When locking a single nut, the washer may also be placed in the rear of the nut and locked in a similar manner.

The manner of locking a pair of bolts and nuts will be readily understoood from the foregoing description by either interposing the washer between the nuts, as illustrated in Fig. 1 of the drawings, or by placing the washer in a position as shown in Fig. 2 of the drawings.

When it is desired to employ the washer as a coupling, the latter is interposed at the junction of the bolts, as shown in Fig. 3 of the drawings, thus forming a positive coupling and simultaneously locking the nuts.

As shown in Fig. 5 of the drawings, the sides are preferably beveled to afford a more convenient handling of the washer, although this feature is not essential to the successful operation of the device.

In case it is desired to lock a bolt, as in the cases of structural iron, the nut may be entirely dispensed with, as illustrated in Fig. 4 of the drawings.

Another decided advantage gained by the use of my improved device is in cases where shafting is broken and it is desired to couple the same rigidly together.

This particular form of nut-lock may also be advantageously employed in light machinery, such as velocipedes, bicycles, tricycles, and the like. In the latter cases the ordinary nut is dispensed with and in lieu thereof my improved washer is employed.

It will be noted that various changes may be made in the details of construction of my invention without departing from the general spirit of my invention.

I am aware that washers for nut-locks have been constructed prior to my invention, having one of the faces beveled, and I do not claim such construction as new; but What I do claim as new, and desire to secure by Letters Patent, is—

1. A nut-lock comprising a washer having opposite faces converging toward the horizontal plane, substantially as described.

2. A nut-lock consisting of a screw-threaded washer having opposite faces converging toward the horizontal plane, forming a substantial wedge shape in cross-section, substantially as herein set forth 3. In a nut-lock, an octagonal washer having opposite faces converging toward the horizontal plane, and interiorly screw-threaded, substantially as shown and described.

In testimony whereof I affix my signature in the presence of two witnesses.

GEORGE D. WING.

Witnesses:
JOHN NOLAND,
E. W. ARTHUR.